(12) United States Patent
Luning (10) Patent No.: US 8,782,471 B2
(45) Date of Patent: Jul. 15, 2014

(54) STORAGE DEVICE PROCUREMENT SYSTEM

(75) Inventor: Stephen Gouze Luning, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 749 days.

(21) Appl. No.: 12/117,811

(22) Filed: May 9, 2008

(65) Prior Publication Data

US 2009/0282200 A1 Nov. 12, 2009

(51) Int. Cl.
*G06F 11/00* (2006.01)
*G06F 11/07* (2006.01)
*G06F 11/34* (2006.01)

(52) U.S. Cl.
CPC ........ *G06F 11/0766* (2013.01); *G06F 11/0748* (2013.01); *G06F 11/3485* (2013.01); *G06F 11/0727* (2013.01)
USPC ............. 714/47.1; 714/4.11; 714/25; 714/43; 714/48; 714/704; 709/213; 705/7.12; 705/7.26; 705/7.27; 705/400

(58) Field of Classification Search
USPC ........... 714/4, 25, 43, 48, 704, 47.1; 709/213; 705/7, 26, 27, 400, 7.12, 7.26, 727
See application file for complete search history.

(56) References Cited

U.S. PATENT DOCUMENTS

| 4,799,156 | A | * | 1/1989 | Shavit et al. ................... 705/26 |
| 4,811,279 | A | * | 3/1989 | Bean et al. .................... 710/305 |
| 4,897,867 | A | * | 1/1990 | Foster et al. ................ 379/93.12 |
| 4,984,155 | A | * | 1/1991 | Geier et al. ...................... 705/26 |
| 5,063,506 | A | * | 11/1991 | Brockwell et al. ................. 705/7 |
| 5,109,337 | A | * | 4/1992 | Ferriter et al. ................... 705/29 |
| 5,224,034 | A | * | 6/1993 | Katz et al. ......................... 705/7 |
| 5,319,542 | A | * | 6/1994 | King et al. ...................... 705/27 |
| 5,361,199 | A | * | 11/1994 | Shoquist et al. ................ 705/26 |
| 5,465,206 | A | * | 11/1995 | Hilt et al. ......................... 705/40 |
| 5,475,585 | A | * | 12/1995 | Bush ............................... 705/26 |
| 5,515,268 | A | * | 5/1996 | Yoda .............................. 705/26 |
| 5,528,490 | A | * | 6/1996 | Hill .............................. 717/168 |
| 5,557,518 | A | * | 9/1996 | Rosen ............................ 705/69 |
| 5,592,375 | A | * | 1/1997 | Salmon et al. ..................... 705/7 |
| 5,592,378 | A | * | 1/1997 | Cameron et al. ................ 705/27 |
| 5,623,660 | A | * | 4/1997 | Josephson ............................ 1/1 |
| 5,666,493 | A | * | 9/1997 | Wojcik et al. ................... 705/26 |
| 5,694,551 | A | * | 12/1997 | Doyle et al. ..................... 705/26 |
| 5,721,832 | A | * | 2/1998 | Westrope et al. ............... 705/27 |
| 5,864,653 | A | * | 1/1999 | Tavallaei et al. .................. 714/2 |
| 5,970,475 | A | * | 10/1999 | Barnes et al. ................... 705/27 |
| 6,182,275 | B1 | | 1/2001 | Beelitz et al. |
| 6,199,179 | B1 | * | 3/2001 | Kauffman et al. .............. 714/26 |
| 6,279,155 | B1 | | 8/2001 | Amberg et al. |
| 6,463,550 | B1 | * | 10/2002 | Cepulis et al. .................. 714/25 |
| 6,598,174 | B1 | * | 7/2003 | Parks et al. ....................... 714/6 |

(Continued)

*Primary Examiner* — Joshua P Lottich
*Assistant Examiner* — Jeison C Arcos
(74) *Attorney, Agent, or Firm* — Terrile, Cannatti, Chambers & Holland, LLP; Stephen A. Terrile (57) ABSTRACT

A storage device procurement system for managing storage failure and full warnings and conditions to minimize a need for storage device inventory. Such a system minimizes a need for storage system administrators to be knowledgeable with procurement options and procedures. Such a system provides for an end-to-end automated storage device procurement system by combining elements of a direct order model with elements of storage array monitoring.

19 Claims, 4 Drawing Sheets

(56) References Cited

U.S. PATENT DOCUMENTS

| | | | |
|---|---|---|---|
| 6,606,744 B1* | 8/2003 | Mikurak | 717/174 |
| 6,760,862 B1* | 7/2004 | Schreiber et al. | 714/15 |
| 6,795,934 B2* | 9/2004 | Nagata et al. | 714/8 |
| 7,047,228 B1 | 5/2006 | Murphy | |
| 7,085,958 B2* | 8/2006 | El-Batal | 714/8 |
| 7,143,007 B2* | 11/2006 | Long et al. | 702/184 |
| 7,225,137 B1* | 5/2007 | Barritz | 705/348 |
| 7,246,262 B2* | 7/2007 | Nagata et al. | 714/8 |
| 7,464,291 B2* | 12/2008 | Nagata et al. | 714/8 |
| 2001/0044841 A1* | 11/2001 | Kosugi et al. | 709/223 |
| 2002/0013743 A1* | 1/2002 | Shoffner | 705/27 |
| 2002/0013837 A1* | 1/2002 | Battat et al. | 709/223 |
| 2002/0087419 A1* | 7/2002 | Andersson et al. | 705/26 |
| 2003/0046602 A1* | 3/2003 | Hino et al. | 714/4 |
| 2003/0172123 A1* | 9/2003 | Polan et al. | 709/213 |
| 2004/0117438 A1* | 6/2004 | Considine et al. | 709/203 |
| 2005/0010843 A1* | 1/2005 | Iwamitsu et al. | 714/724 |
| 2005/0223266 A1* | 10/2005 | Iwamitsu et al. | 714/5 |
| 2005/0278581 A1* | 12/2005 | Jiang et al. | 714/40 |
| 2006/0112304 A1* | 5/2006 | Subramanian et al. | 714/6 |
| 2007/0067586 A1* | 3/2007 | Mikami | 711/162 |
| 2007/0174657 A1* | 7/2007 | Ahmadian et al. | 714/4 |

* cited by examiner

STORAGE DEVICE PROCUREMENT SYSTEM

BACKGROUND OF THE INVENTION

1. Field of the Invention

The present invention relates to information handling systems and more particularly to a storage device procurement system.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One example of an information handling system is a disk based storage controller system. The design of disk based storage controller systems incorporate disk and data redundancy with a design that prevents application data loss even when one or more disks fail and the data on that disk is destroyed. Such systems are generally referred to as redundant array of independent disk (RAID) systems and there are many varieties of designs. Some systems provide RAID capability through software, some with hardware controllers, some with special disks, and some with a multiple of these.

A feature of RAID systems is the ability to remove a failed disk, to replace the failed disk with a new disk, and to rebuild the data for the new disk from the remaining good disks in the RAID system (i.e., to restore the lost data). A desirable feature of RAID systems is the ability to expand capacity by replacing or adding disks to the RAID system. In this case, data in the RAID group is usually redistributed to incorporate the new disk and assure that data redundancy allows any disk of the new group to fail as before.

Some RAID systems monitor disk operation and storage use so that the need for disk replacement or disk addition can be predicted. In these systems, multiple transient errors (i.e., errors recovered by operation retry and other methods) and remaining capacity limits are used to initiate a disk replacement or addition. Initiating a replacement or addition, before the disk fails or runs out of capacity, reduces the urgency and cost of the repair or expansion operation.

An early warning system can have certain limitations. For example, for certain early warning systems the message or indicator may be local to the RAID system or may be propagated to the storage system administrator. With such an early warning system, the storage system administrator has to manage the disk procurement process as well as associated inventory. Additionally certain early warning systems, (especially for example, consumer and low end storage systems), the end user must act as a storage system administrator and become familiar with storage device procurement options.

Accordingly, it would be desirable to provide an automated storage device procurement system.

SUMMARY OF THE INVENTION

In accordance with the present invention, a storage device procurement system for managing storage failure and full warnings and conditions to minimize a need for storage device inventory is set forth. Such a system also minimizes a need for storage system administrators to be knowledgeable with procurement options and procedures. Such a system provides for an end-to-end automated storage device procurement system by combining elements of a direct order model with elements of storage array monitoring.

The storage device procurement system provides a system of one or more storage devices that are locally or remotely managed by a storage device procurement system (SDPS) agent. The SDPS agent provides a plurality of functions. More specifically, in certain embodiments, the SDPS agent monitors storage controller events (which may be through query, log monitoring, etc.), identifies conditions that should initiate a procurement operation (e.g., RAID controller warnings, a high number of disk failures, etc.), generates local notification of a procurement suggestion (the suggestions are analogous to the "ink cartridge is running low" message for printers). In various embodiments, the SDPS agent notifications may be to a local console, to a remote console, over email or via any other preferred customer interface. Additionally, in certain embodiments, the SDPS agent connects to a supplier customer database to determine an appropriate part to be dispatched along with associated billing, dispatch and monetary transaction management; the SDPS agent provides device identification tagging for dispatch and tracking; the SDPS agent suspends a procurement process until dispatched device arrives; the SDPS agent resumes the procurement process when a dispatched device arrives based on device identification tagging; the SDPS device identifies a specific location for a storage device to be installed along with any associated removal or replacement process steps; the SDPS device validates that the procurement process is successfully completed; the SDPs device provides for step monitoring record keeping and activation of human intervention for delays or problems.

More specifically, in one embodiment, the invention relates to a method for automatically procuring a storage device for use with an information handling system which includes installing a storage device procurement system agent onto the information handling system, monitoring storage device failure, full warnings, and conditions within the information handling system via the storage device procurement system agent, communicating with a storage device provider via the storage device procurement system agent, and automatically procuring a storage device based upon the monitoring via the storage device procurement system agent.

In another embodiment, the invention relates to an apparatus for automatically procuring a storage device for use with an information handling system which includes means for installing a storage device procurement system agent onto the information handling system, means for monitoring storage device failure, full warnings, and conditions within the information handling system via the storage device procurement system agent, means for communicating with a storage device provider via the storage device procurement system agent, and means for automatically procuring a storage device based upon the monitoring via the storage device procurement system agent.

In another embodiment, the invention relates to an information handling system comprising a processor and memory coupled to the processor. The memory stores a storage device procurement system agent that automatically enables procuring a storage device. The storage device procurement system agent includes instructions for monitoring storage device failure, full warnings, and conditions within the information handling system via the storage device procurement system agent, communicating with a storage device provider via the storage device procurement system agent, and automatically procuring a storage device based upon the monitoring via the storage device procurement system agent.

BRIEF DESCRIPTION OF THE DRAWINGS

The present invention may be better understood, and its numerous objects, features, and advantages made apparent to those skilled in the art by referencing the accompanying drawings. The use of the same reference number throughout the several figures designates a like or similar element.

DETAILED DESCRIPTION

Figure 1:
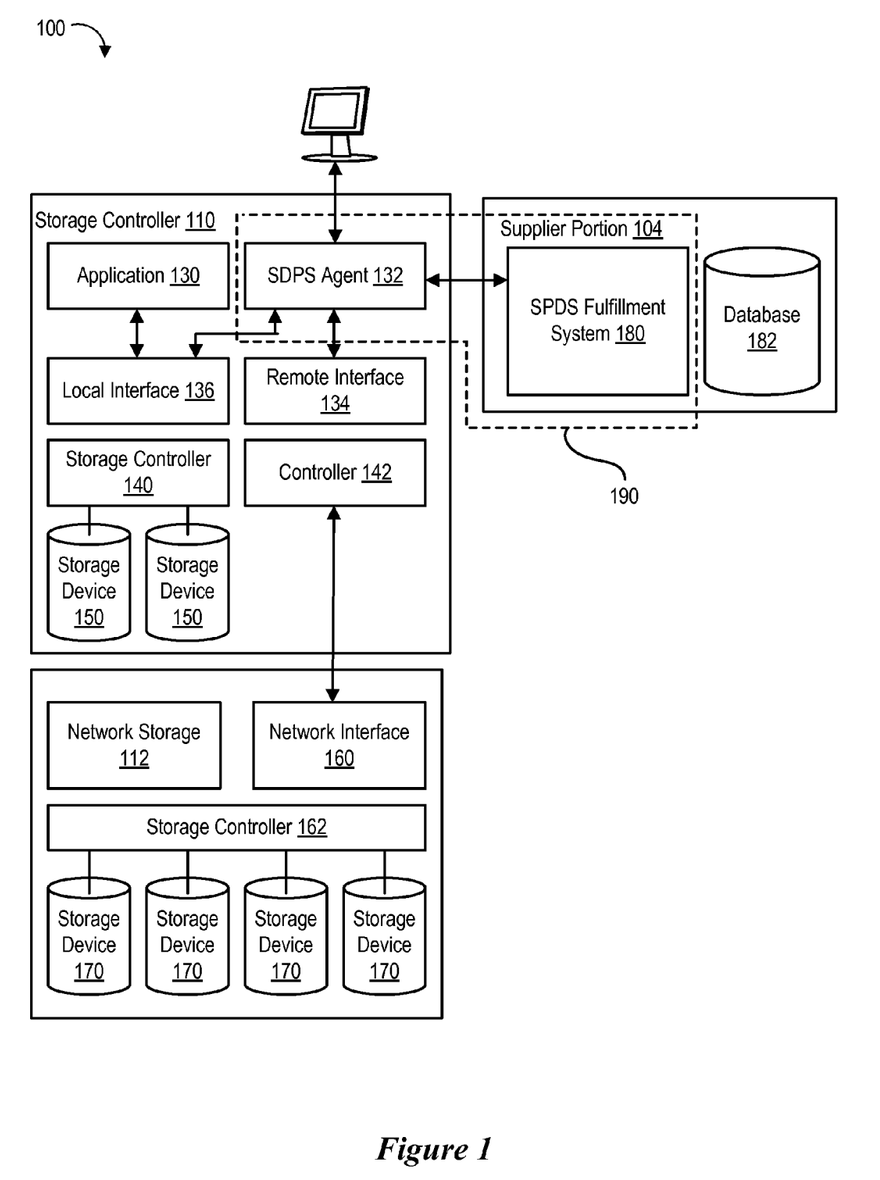
FIG. 1 shows a block diagram of a storage device procurement system environment.

Referring to FIG. 1, a block diagram of storage device procurement system environment 100 is shown. The storage device procurement system manages storage failure and full warnings and conditions to minimize a need for storage device inventory is set forth. Such a system also minimizes a need for storage system administrators to be knowledgeable with procurement options and procedures. Such a system provides for an end-to-end automated storage device procurement system by combining elements of a direct order model with elements of storage array monitoring.

The disk based storage device procurement environment 100 includes a customer portion 102 and a supplier portion 104. The customer portion 102 includes a disk based storage controller system 110 and can optionally include a network storage system 112.

The storage controller system 110 includes an application 130, such as a storage application, as well as a SDPS agent 132. The storage controller system 110 also includes a local interface 134 as well as a remote interface 136. The local interface is coupled to a storage controller 140 and the remote interface is coupled to a remote controller 142. The storage controller is coupled to one or more local storage devices 150.

The remote controller 142 may be coupled via bus such as a storage bus to a network interface 160 of the network storage device 112. The network interface 160 is coupled to a network storage controller 162, which is in turn coupled to one or more remote storage devices 170.

The supplier portion 102 includes a SPDS fulfillment system 180 as well as a supplier database 182. The SPDS fulfillment system 180 communicates with customer SDPS agents 132. The combination of the SDPS agent 132 and the SPDS fulfillment system 180 provides the storage device procurement system 190.

Figure 2:
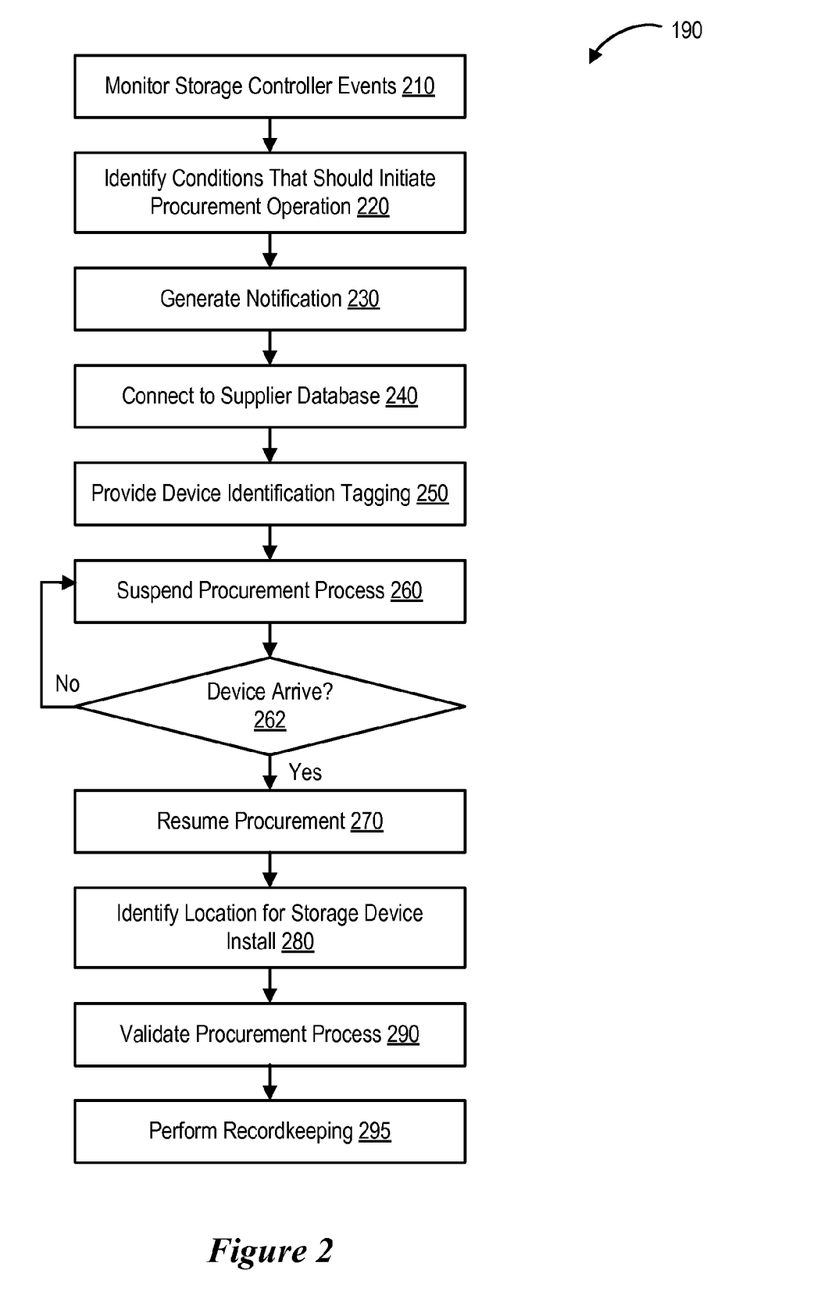
FIG. 2 shows a flow chart of the operation of a storage device procurement system.

Referring to FIG. 2, a flow chart of the operation of a storage device procurement system 190 is shown. The storage device procurement system provides a system of one or more storage devices that are locally or remotely managed by a storage device procurement system (SDPS) agent 132. The SDPS agent 132 provides a plurality of functions. More specifically, in certain embodiments, the SDPS agent monitors storage controller events (which may be through query, log monitoring, etc.) at step 210, identifies conditions that should initiate a procurement operation (e.g., RAID controller warnings, a high number of disk failures, etc.) at step 220, generates local notification of a procurement suggestion (the suggestions are analogous to the "ink cartridge is running low" message for printers) at step 230. In various embodiments, the SDPS agent notifications may be to a local console, to a remote console, over email or via any other preferred customer interface. Additionally, in certain embodiments, the SDPS agent connects to a supplier database 182 to determine an appropriate part to be dispatched along with associated billing, dispatch and monetary transaction management at step 240; the SDPS agent provides device identification tagging for dispatch and tracking at step 250; the SDPS agent suspends a procurement process at step 260 until dispatched device arrives as determined by step 262; the SDPS agent resumes the procurement process when a dispatched device arrives based on device identification tagging at step 270; the SDPS device identifies a specific location for a storage device to be installed along with any associated removal or replacement process steps at step 280; the SDPS device validates that the procurement process is successfully completed at step 290; and, the SDPS device provides for step monitoring record keeping and activation of human intervention for delays or problems at step 295.

Figure 3:
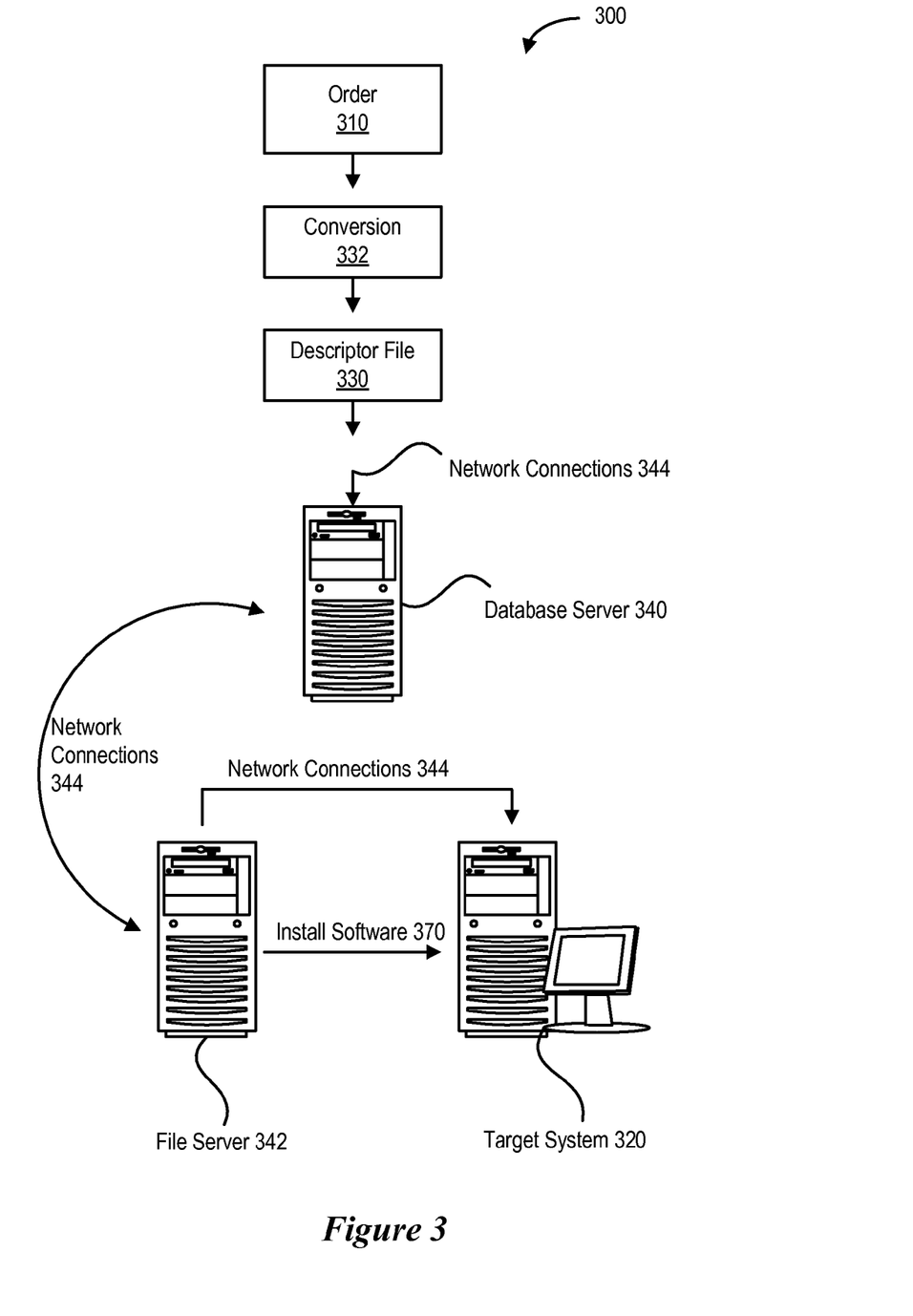
FIG. 3 shows an example of an automated build to order system for installing storage device procurement system software on an information handling system.

Referring to FIG. 3, a schematic diagram of a software installation system 300 at an information handling system-manufacturing site is shown. In operation, when the customer order requires that information be placed on the storage device before it is sent to the customer site, an order 310 is placed to purchase a software initialized storage device. The target information handling system 320 provides the ability to format and pre-install information to ease replacement at the customer installation. In some cases, this information may be data that the customer has sent to the manufacturer as part of a data backup service. In other cases, this information may be configuration specific data to assure proper capabilities are established for operation in the customer environment.

Once the storage device is initialized and tested, it is removed from the information handling system 320 and is shipped to the customer. Such software installation and testing advantageously ensures a reliable, working information handling system which is ready to operate when received by a customer.

Because different families of information handling systems and different individual computer components require different software installation, it is necessary to determine which software to install on a target storage device. A descriptor file 330 is provided by converting an order 310, which corresponds to a desired information handling system having desired components, into a computer readable format via conversion module 332. The descriptor file 330 can also include which content to load on the system that is specific to the customer product where the storage device will be used or to the customer application that has been used to provide the manufacturer with specific data for recovery purposes.

Component descriptors are computer readable descriptions of the components of target information handling system 320 which components are defined by the order 310. In a preferred embodiment, the component descriptors are included in a descriptor file called a system descriptor record which is a computer readable file containing a listing of the components, both hardware and software, to be installed onto the storage device via the target information handling system 320. Having read the plurality of component descriptors, database server 340 provides a plurality of software components corresponding to the component descriptors to file server 342 over network connection 344. Network connections 344 may be any network connection well known in the art, such as a local area network, an intranet, or the internet. The information contained in database server 340 is often updated such that the database contains a new factory build environment. These updates can include new content to install onto the fixed image platform. The software is then installed 370 on the target information handling system 320. The software installation is controlled by a software installation management server that is operable to control the installation of the operating system and other software packages specified by a customer.

Figure 4:
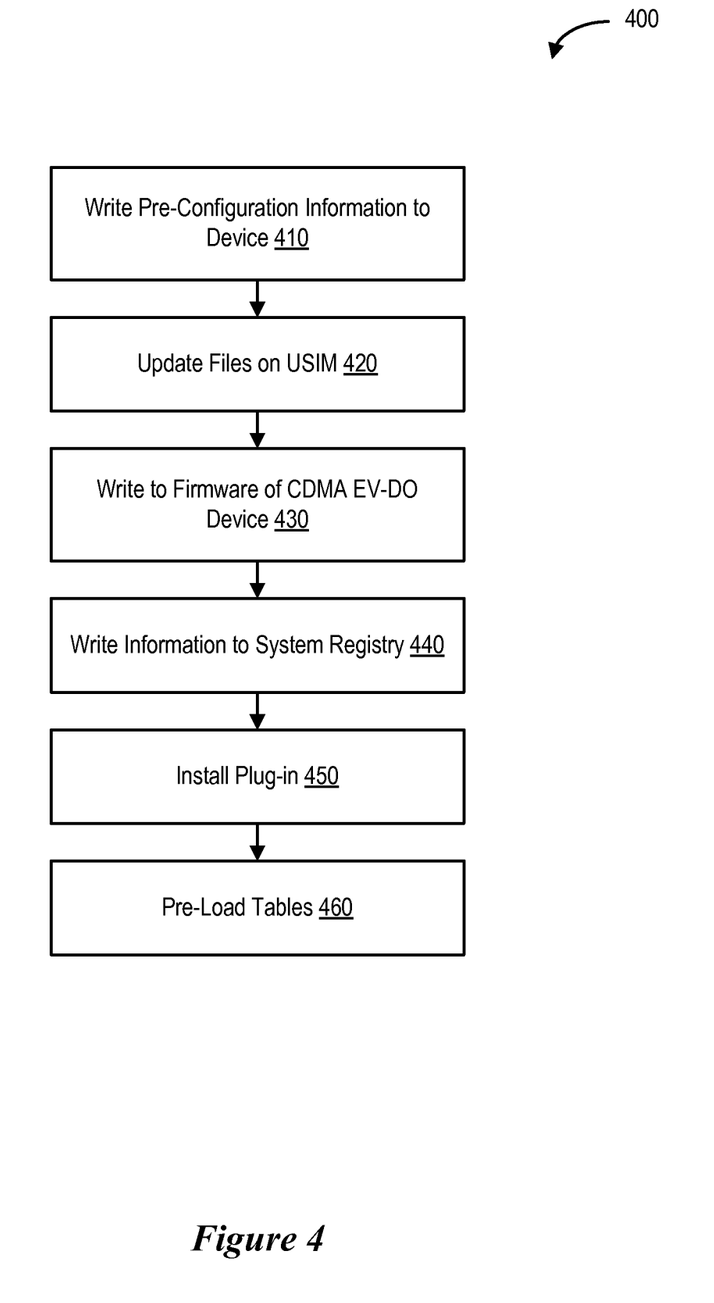
FIG. 4 shows a block diagram on an example information handling system that includes a storage device procurement application.

Referring to FIG. 4, an example of an information handling system 400, which implements a storage controller such as the storage controller 110. The information handling system 400 may be configured as the target information handling system 320. The information handling system 400 includes a processor 402, input/output (I/O) devices 404, such as a display, a keyboard, a mouse, and associated controllers, a memory 406, including both volatile memory such as Random Access Memory and non-volatile memory such as a hard disk and drive, and other storage devices 408, such as a floppy disk and drive and other memory devices, and various other subsystems 410, all interconnected via one or more buses 412. The information handling system 400 also includes an SDPS agent 430 and an application 440 that accesses the SDPS application 430.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably, or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method for automatically procuring a storage device for use with an information handling system comprising:
   installing a storage device procurement system agent onto the information handling system;
   monitoring storage device failure and full warnings and conditions within the information handling system via the storage device procurement system agent;
   communicating with a storage device provider via the storage device procurement system agent; and,
   automatically procuring a storage device based upon the monitoring via the storage device procurement system agent;
   the storage device procurement system agent connects to a supplier customer database to determine an appropriate part to be dispatched along with associated billing, dispatch and monetary transaction management; provides device identification tagging for dispatch and tracking; identifies a specific location for a storage device to be installed along with any associated removal or replacement process steps; validates that the procurement process is successfully completed; and, provides for step monitoring record keeping and activation of human intervention for delays or problems.

2. The method of claim 1 wherein:
   the information handling system comprises a plurality of storage devices; and, the storage device procurement system agent monitors storage device failure and full warnings for a plurality of storage devices.

3. The method of claim 1 wherein:
   the information handling system comprises a plurality of storage devices; and, the storage device procurement system agent enables both local and remote monitoring of the plurality of storage devices.

4. The method of claim 1 wherein:
the storage device procurement system agent monitors storage controller events, identifies conditions that should initiate a procurement operation, and generates local notification of a procurement suggestion.

5. The method of claim 1 wherein:
the storage device procurement system agent generates storage device procurement system agent notifications that are to a local console, to a remote console, over email or via a other preferred customer interface.

6. The method of claim 1 wherein:
the storage device procurement system agent suspends a procurement process until dispatched device arrives and resumes the procurement process when a dispatched device arrives based on device identification tagging.

7. An apparatus for automatically procuring a storage device for use with an information handling system comprising:
means for installing a storage device procurement system agent onto the information handling system;
means for monitoring storage device failure and full warnings and conditions within the information handling system via the storage device procurement system agent;
means for communicating with a storage device provider via the storage device procurement system agent; and,
means for automatically procuring a storage device based upon the monitoring via the storage device procurement system agent;
the storage device procurement system agent connects to a supplier customer database to determine an appropriate part to be dispatched along with associated billing, dispatch and monetary transaction management; provides device identification tagging for dispatch and tracking;
identifies a specific location for a storage device to be installed along with any associated removal or replacement process steps;
validates that the procurement process is successfully completed; and,
provides for step monitoring record keeping and activation of human intervention for delays or problems.

8. The apparatus of claim 7 wherein:
the information handling system comprises a plurality of storage devices; and, the storage device procurement system agent monitors storage device failure and full warnings for a plurality of storage devices.

9. The apparatus of claim 7 wherein:
the information handling system comprises a plurality of storage devices; and, the storage device procurement system agent enables both local and remote monitoring of the plurality of storage devices.

10. The apparatus of claim 7 wherein:
the storage device procurement system agent monitors storage controller events, identifies conditions that should initiate a procurement operation, and generates local notification of a procurement suggestion.

11. The apparatus of claim 7 wherein:
the storage device procurement system agent generates storage device procurement system agent notifications that are to a local console, to a remote console, over email or via a other preferred customer interface.

12. The apparatus of claim 7 wherein:
the storage device procurement system agent suspends a procurement process until dispatched device arrives and resumes the procurement process when a dispatched device arrives based on device identification tagging.

13. An information handling system comprising:
a processor;
memory coupled to the processor, the memory storing a storage device procurement system agent, the storage device procurement system agent enabling automatically procuring a storage device, the storage device procurement system agent comprising instructions for:
monitoring storage device failure and full warnings and conditions within the information handling system;
communicating with a storage device provider; and,
automatically procuring a storage device based upon the monitoring;
the storage device procurement system agent connects to a supplier customer database to determine an appropriate part to be dispatched along with associated billing, dispatch and monetary transaction management; provides device identification tagging for dispatch and tracking;
identifies a specific location for a storage device to be installed along with any associated removal or replacement process steps; validates that the procurement process is successfully completed; and, provides for step monitoring record keeping and activation of human intervention for delays or problems.

14. The information handling system of claim 13 further comprising:
a plurality of storage devices; and wherein, the storage device procurement system agent monitors storage device failure and full warnings for a plurality of storage devices.

15. The information handling system of claim 13 further comprising:
a plurality of storage devices; and wherein, the storage device procurement system agent enables both local and remote monitoring of the plurality of storage devices.

16. The information handling system of claim 13 wherein:
the storage device procurement system agent monitors storage controller events, identifies conditions that should initiate a procurement operation, and generates local notification of a procurement suggestion.

17. The information handling system of claim 13 wherein:
the storage device procurement system agent generates storage device procurement system agent notifications that are to a local console, to a remote console, over email or via a other preferred customer interface.

18. The information handling system of claim 13 wherein:
the storage device procurement system agent suspends a procurement process until dispatched device arrives and resumes the procurement process when a dispatched device arrives based on device identification tagging.

19. A method for managing storage device failure to minimize storage device inventory comprising:
installing a storage device procurement system agent onto an information handling system;
monitoring storage device failure and full warnings and conditions within the information handling system via the storage device procurement system agent;
communicating with a storage device provider via the storage device procurement system agent; and,
automatically procuring a storage device based upon the monitoring via the storage device procurement system agent; and wherein
the storage device procurement system agent connects to a supplier customer database to determine an appropriate part to be dispatched along with associated billing, dispatch and monetary transaction management; provides device identification tagging for dispatch and tracking;
identifies a specific location for a storage device to be installed along with any associated removal or replacement process steps; validates that the procurement process is successfully completed; and, provides for step monitoring record keeping and activation of human intervention for delays or problems.

\* \* \* \* \*